United States Patent [19]

Simmons

[11] 4,205,927
[45] Jun. 3, 1980

[54] FLANGED JOINT STRUCTURE FOR COMPOSITE MATERIALS

[75] Inventor: Roy Simmons, Bristol, England

[73] Assignee: Rolls-Royce Limited, London, England

[21] Appl. No.: 968,733

[22] Filed: Dec. 12, 1978

[30] Foreign Application Priority Data

Dec. 16, 1977 [GB] United Kingdom ............... 52567/77

[51] Int. Cl.² .......................... F16D 1/00; F16L 23/00
[52] U.S. Cl. ..................................... 403/337; 285/412
[58] Field of Search ............... 403/335, 337; 285/368, 285/114, 363, 412, 178, 414, 405; 29/157 R, 526

[56] References Cited

U.S. PATENT DOCUMENTS

| | | | |
|---|---|---|---|
| 1,986,419 | 1/1935 | Taylor | 285/368 X |
| 2,328,031 | 8/1943 | Risley | 285/368 X |
| 3,436,102 | 4/1969 | Shelly | 285/114 |
| 3,757,827 | 9/1973 | Seiwert | 285/363 X |
| 3,791,679 | 2/1974 | Glover | 285/405 X |

FOREIGN PATENT DOCUMENTS 580911 8/1958 Italy .......................................... 285/412

Primary Examiner—Wayne L. Shedd
Attorney, Agent, or Firm—Stevens, Davis, Miller & Mosher

[57] ABSTRACT

A flanged joint structure for enabling a first member made from a fibre re-inforced composite material to be bolted to a second member includes means defining on the first member a continuous flange extending at right angles to the member, and an intermediate connecting portion which is bonded to the first member and which is bonded to the flange along a line which alternately passes above and below the mean plane of the loads applied by the bolts. This construction minimizes bending loads in the flange.

6 Claims, 12 Drawing Figures

FLANGED JOINT STRUCTURE FOR COMPOSITE MATERIALS

The present invention relates to flanged joint structures suitable for enabling a member made from a fibre re-inforced composite material to be bolted to a second member.

Fibre re-enforced composite materials, for example, carbon fibres in a resin matrix, generally have a high resistance to tensile loads in the direction of the longitudinal axis of the fibres due to the presence of the fibres. Also when bonded via the matrix material to surface, the bonded joint has a high resistance to shearing in the plane of the joint. Such materials are, however, relatively weak in bending and the joints have low resistance to peeling or shear across the plane of the joint i.e. forces which put the fibres in shear.

In a conventional flanged joint between two members held together by bolts, the flanges stand at right angles to the main bodies of the two members and the load applied by the bolts puts a bending moment into the flange.

An object of the present invention is to provide a bolted flanged joint structure for a fibre re-inforced composite material which eliminates, or significantly reduces the bending moments in the flange compared to a conventional bolted flanged joint.

According to the present invention a flanged joint structure for a bolted connection between a first member made from a fibre re-inforced composite material and a second member comprises, means defining a continuous flange, which lies in a first plane and which is adapted to be bolted to a surface of the second member, and an intermediate connecting portion which is joined at one of its ends to the flange at least along a line which alternately passes to either side of a plane which defines the mean plane of the load applied by bolts when the two members are bolted together, and which is joined to the first member in a plane which lies at an angle to the first plane.

The flange and the intermediate connecting portion may be formed separately from the first member and connected thereto. In this case the connecting portion may be made up from a plurality of individual mouldings connected together, or from elongate corrugated mouldings. Where the members to be joined require the provision of annular flanges the elongate corrugated mouldings may be part-annular and joined together to form a complete annulus.

In an alternative form of the invention the flange and the intermediate connecting portion may be formed as part of the first member itself. For example, the first member may have an annular wall which consists of radially inner and outer fibre re-inforced resin skins separated by a lightweight structure, one of the skins being extended to form the flange, the other skin also being extended into contact with the flange and being corrugated produce the required line of contact on either side of the plane of the bolts.

Examples of the invention will now be more specifically described with reference to the accompanying drawings in which.

Figure 1:
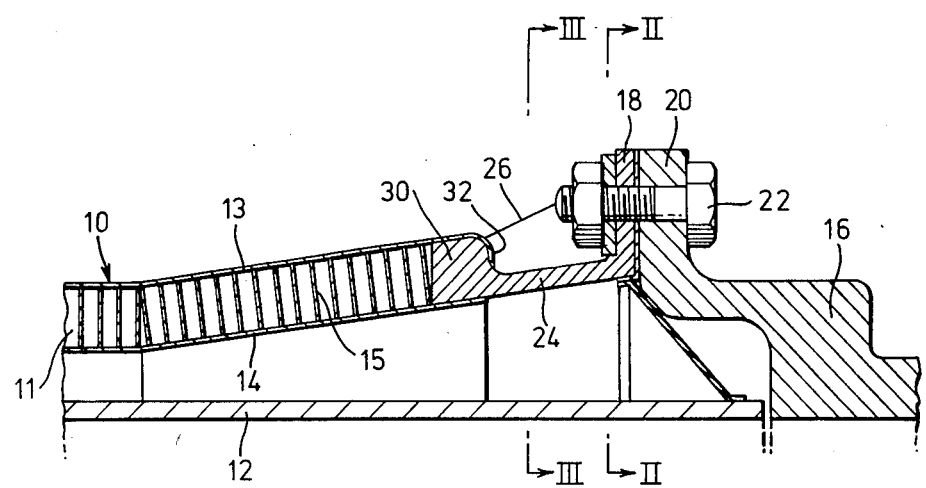
FIG. 1 is a section through part of a fibre re-inforced composite casing including a flanged joint structure of the present invention connected to a metallic casing.

Referring now to the drawings, FIG. 1 illustrates a casing 10 for a gas turbine engine compressor which has a double skinned outer wall 11 and an inner wall 12. The outer wall is made of a composite material, and consists of outer and inner skins 13 and 14 respectively separated by a lightweight honeycombe material 15. The outer wall 11 is connected at its downstream end to a metallic casing 16 of a second compressor.

The two casings are connected through a bolted joint in which a flange 18 on the first compressor casing is connected to a flange 20 on the second compressor casing by means of a plurality of bolts 22. The flange 18 forms part of a flanged joint structure on the outer wall 11 which is designed to minimise bending loads in the flange 18.

Figure 2:
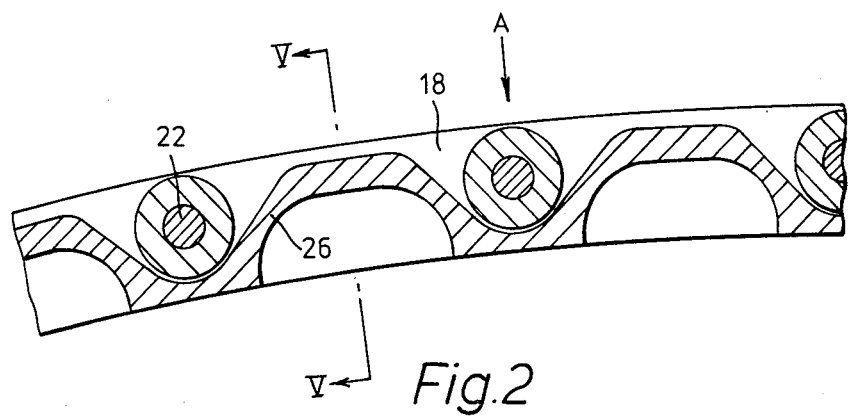
FIG. 2 is a view on the line II of FIG. 1.
Figure 4:
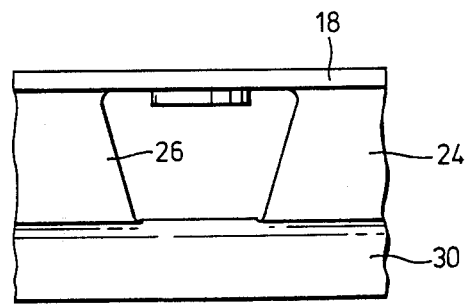
FIG. 4 is a view on the arrow A of FIG. 2.
Figure 3:
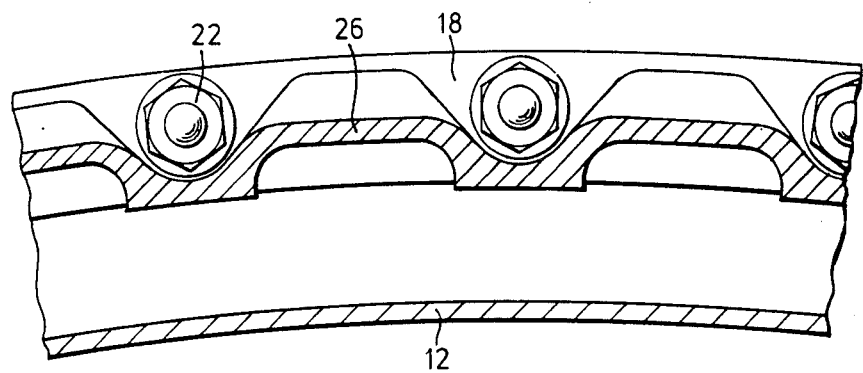
FIG. 3 is a view on the line III—III of FIG. 1.
Figure 5:
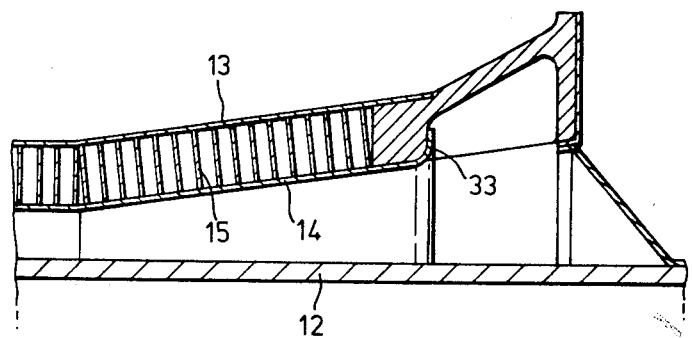
FIG. 5 is a view on the line V—V of FIG. 2.

In this example the flanged jointed structure consists of a plurality of moulded segments 24 which extend partly around the circumference of the casing and are assembled together to form a complete annulus. Each moulding has the flange 18 at one of its axial ends, which is continuous around the circumference, a corrugated intermediate connecting portion 26, and a continuous circumferentially extending ring 30 at its other axial end. FIGS. 2 and 3 show the shape of the corrugated portion more clearly and it can be seen that the corrugated portion is connected to the flange along a line which alternately passes above and below the pitch circle of the bolts 22. The loads provided by the bolts when the flanges are bolted together are passes into the corrugated portion at varying radii and since the corrugated portion corrugated portion reduces in diameter towards the end ring 30, the loads are transmitted into the end ring 30 evenly with greatly reduced bending moments on the flange 18 compared to a conventional bolted flanged joint.

The end ring 30 is connected to the downstream end of the outer wall 11 of the casing by bonding the two skins 13 and 14 to the inner and outer surfaces of the ring 30.

Each of the inner and outer skins are made from a fibre re-inforced resin material, for example, a cross woven carbon fibre re-inforced material. Thus, when load is applied to the bonded joint the fibres over-lying the ring 30 are in tension and the resin bond is in shear. The axial ends of the skins can be turned radially into the recesses formed by the corrugations a shown at 32 and 33 in order to provide a positive lock on the ring 30. The corners around which the fibres are turned are provided with a generous radius to ensure that the fibres remain in tension.

Figure 6:
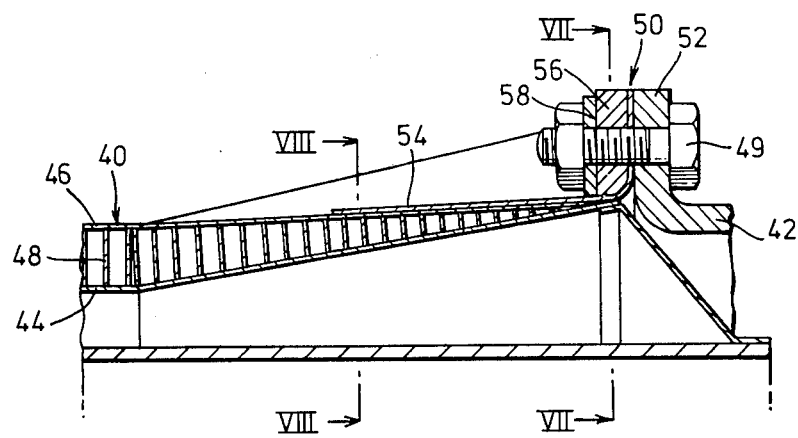
FIG. 6 is a section through a casing similar to that of FIG. 1 showing an alternative form of flanged joint structure according to the invention.
Figure 10:
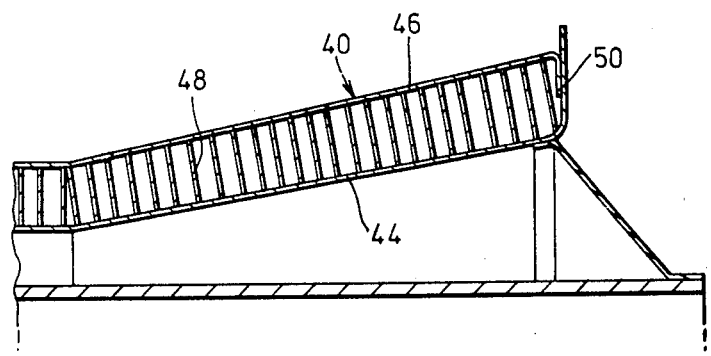
FIG. 10 is a view on the line IX—IX of FIG. 7.

Referring now to FIGS. 6 and 10 there is shown an alternative form of joint structure which is similar to that of FIGS. 1 to 5, and, once again, is illustrated in an application to a joint between the first and second compressor casings 40 and 42 respectively of a gas turbine engine.

Figure 7:
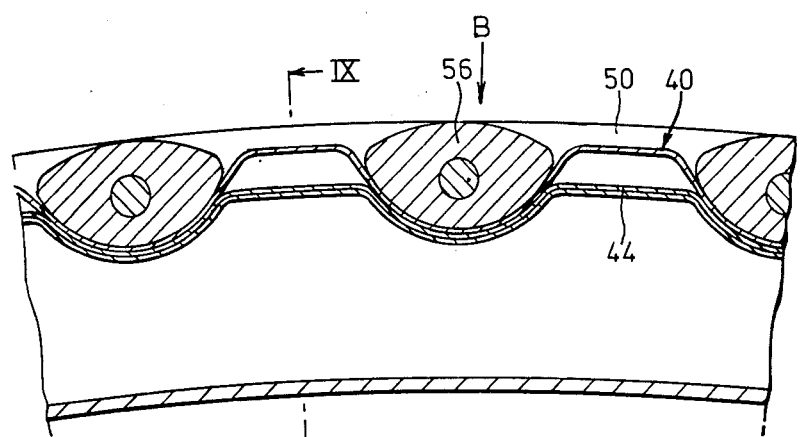
FIG. 7 is a view on the line VII—VII of FIG. 6.
Figure 8:
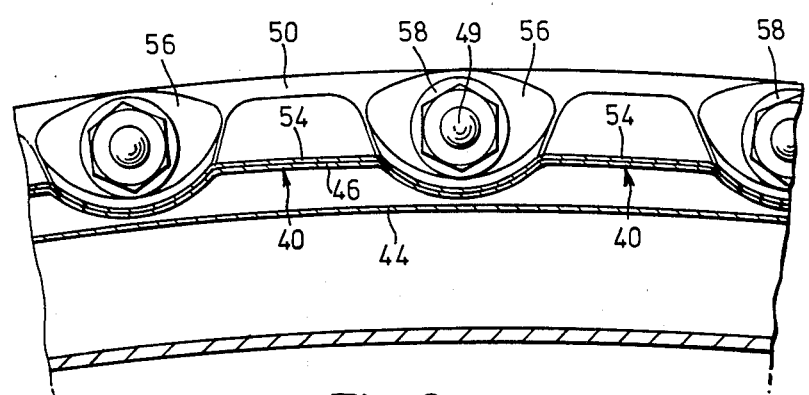
FIG. 8 is a view on the line VIII—VIII of FIG. 7.
Figure 9:
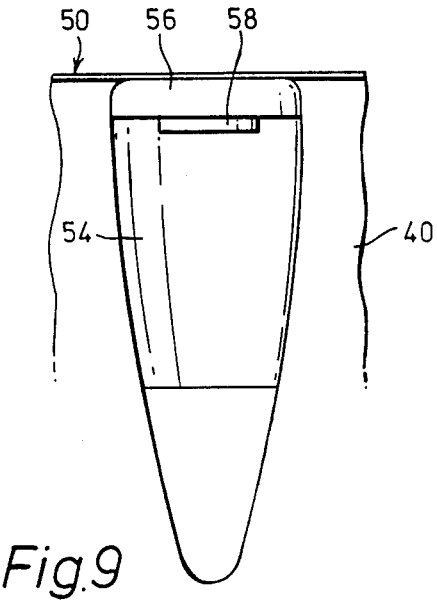
FIG. 9 is a view on the arrow B of FIG. 7.

In this embodiment the first casing 40 is double skinned and consists of radially inner and outer skins 44 and 46 which are of fibre re-inforced composite material separated by a honeycombe structure 48. The joint structure forms an integral part of the casing 40, and the two casings are bolted together by means of bolts 49 through flanges 50 and 52 on the respective casings. Flange 50 on the first casing is provided in this case by an axial extension of the radially inner skin 46 which is turned at right angles to form the flange. In order to reduce the bending moments being applied to the flange 50 when bolts 52 are tightened skin 44 is extended axially to connect to the flange 50, and the skin is corrugated so that where it connects to the flange the joint forms a line which passes on either side of the pitch circle diameter of the bolts 52. This can be seen more clearly in FIG. 7.

At the flange 50 the radially inner parts of the cross woven corrugated skin 44 are terminated over the areas at the bottom of each corrugation, and a re-inforcing skin 54 of unidirectional fibres is substituted and bonded to the skin 44.

The skin 54 is bent at right angles so that it can be bonded to the flange 50, the unidirectional fibres allowing bending to take place without creasing the skin. At the points where the bolts pass through the flange, re-inforcing moulded segments 56 are provided along with load spreading washers 58. The segments are provided with a large radius on the corner where the fibres contact the flange 50 so that the fibres are always maintained in tension as the loads from the bolts are applied to the flange.

Figure 11:
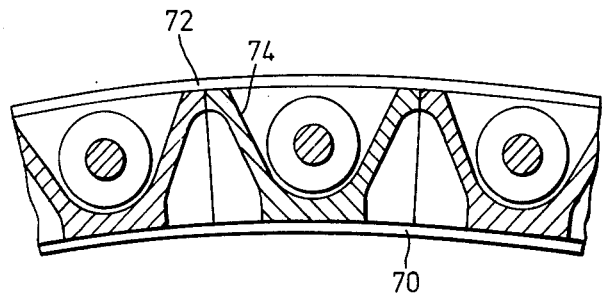
FIG. 11 is a section similar to FIG. 2 through a further alternative flange structure according to the invention.
Figure 12:
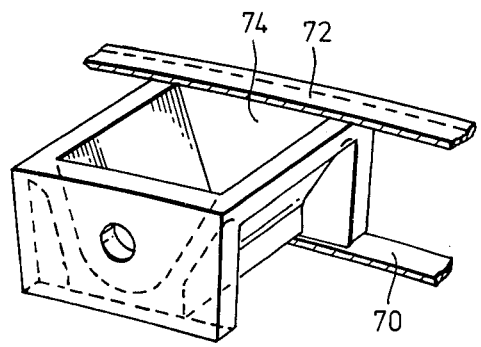
FIG. 12 is a pictorial view of one of the flange segments of FIG. 11.

In a third alternative embodiment illustrated in FIGS. 11 and 12 the segments 74 are individually moulded as shown in FIG. 12 which are assembled together to form a complete annulus. Skins 70 and 72 of the inner and outer walls are bonded to axial end surfaces 76,78 of the mouldings 74 to provide a strong bond in shear and it can be seen that the mouldings are so shaped that their end surfaces provide a corrugated surface to which a flange of a second member can be joined.

It can be seen that the corrugated surface passes to either side of the pitch circle diameter of bolts 80 which are used to bolt the flanges together and once again all the loads are taken between the flanges through tension in fibres and shear in the bonded joints.

I claim:

1. A flanged joint structure for a bolted connection between a first member made from a fibre re-inforced material and a second member, said structure being connected to the first member and comprising, means defining a continuous flange, which lies in a first plane and which is adapted to be bolted to a surface of the second member, and an intermediate connecting portion which is joined at one of its ends to the flange at least along a line which alternately passes to either side of a plane, which defines the mean plane of the load applied by bolts when the two members are bolted together, and being joined to the first member in a plane which lies at an angle to the first plane. the first member in a plane which lies at an angle to the first plane.

2. A flanged joint structure as claim in claim 1 and in which said first member is double skinned, the skins being separated by a lightweight structure.

3. A flanged joint structure as claim in claimed 2 and in which one of the skins of the first member is extended to produce said flange and the other one of the skins is extended to provide said intermediate portion, the intermediate portion being corrugated and being connected to the flange along a line which alternately passes above and below the mean plane of the load applied by bolts when the members are bolted together.

4. A flanged joint structure as claimed in claim 1 and in which, the flange and the intermediate connecting portion are formed together on a moulding which is connected to the first member.

5. A flanged joint structure as claimed in claim 4 in which the moulding comprises a plurality of individual segments assembled together.

6. A flanged joint structure as claimed in claim 4 in which the moulding comprises a plurality of part-annular mouldings assembled into an annular array and which are of corrugated form.

* * * * *